United States Patent
Popovski et al.

(10) Patent No.: US 11,545,716 B2
(45) Date of Patent: Jan. 3, 2023

(54) TRACTION BATTERY UPPER-TIER BATTERY ARRAY SUPPORT ASSEMBLY AND SUPPORT METHOD

(71) Applicant: Ford Global Technologies, LLC, Dearborn, MI (US)

(72) Inventors: Mike Popovski, Warren, MI (US); Ihab Grace, Grosse Pointe Woods, MI (US); Micah Smith, Detroit, MI (US); John Jardine, Harrison Township, MI (US); Mladen Marjanovic, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 17/079,657

(22) Filed: Oct. 26, 2020

(65) Prior Publication Data
US 2022/0131119 A1   Apr. 28, 2022

(51) Int. Cl.
| | |
|---|---|
| *H01M 50/291* | (2021.01) |
| *H01M 50/209* | (2021.01) |
| *H01M 50/242* | (2021.01) |
| *H01M 50/249* | (2021.01) |

(52) U.S. Cl.
CPC ....... *H01M 50/291* (2021.01); *H01M 50/209* (2021.01); *H01M 50/242* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 9,083,029 B2 | 7/2015 | Lee et al. | |
| 9,356,270 B2 | 5/2016 | Subramanian et al. | |
| 10,297,803 B2 | 5/2019 | Boddakayala et al. | |
| 2011/0151308 A1* | 6/2011 | Yoon | H01M 50/20 429/151 |
| 2011/0165451 A1 | 7/2011 | Kim et al. | |
| 2013/0052515 A1* | 2/2013 | Park | H01M 50/262 429/159 |
| 2013/0136970 A1* | 5/2013 | Kurokawa | H01M 50/20 429/99 |
| 2015/0111074 A1* | 4/2015 | Boddakayala | H01M 10/625 429/72 |
| 2015/0243950 A1* | 8/2015 | Hara | B60K 1/04 429/99 |
| 2015/0249238 A1* | 9/2015 | Andre | H01M 10/613 429/99 |
| 2018/0294450 A1* | 10/2018 | Haag | B60L 50/64 |
| 2018/0337377 A1* | 11/2018 | Stephens | H01M 50/20 |

FOREIGN PATENT DOCUMENTS

CN       206076332 U  *  4/2017

* cited by examiner

Primary Examiner — Gregg Cantelmo
(74) Attorney, Agent, or Firm — David B. Kelley; Carlson, Gaskey & Olds, P.C.

(57) ABSTRACT

A multi-tier traction battery support assembly includes, among other things, a lower-tier battery array, an intermediate bracket directly secured to at least one endplate of the lower-tier battery array, and an upper-tier battery array supported on the intermediate bracket. A multi-tier traction battery support method includes supporting an intermediate bracket with at least one endplate of a lower-tier battery array and supporting an upper battery array with the intermediate bracket. The intermediate bracket is secured directly to the at least one endplate.

19 Claims, 4 Drawing Sheets

TRACTION BATTERY UPPER-TIER BATTERY ARRAY SUPPORT ASSEMBLY AND SUPPORT METHOD

TECHNICAL FIELD

This disclosure relates generally to supporting an upper-tier battery array of a multi-tier traction battery.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), and battery electric vehicles (BEVs). The traction battery can include battery arrays arranged in tiers.

SUMMARY

A multi-tier traction battery support assembly according to an exemplary aspect of the present disclosure includes, among other things, a lower-tier battery array, an intermediate bracket directly secured to at least one endplate of the lower-tier battery array, and an upper-tier battery array supported on the intermediate bracket.

In another example of the foregoing assembly, the lower-tier battery array is vertically beneath the intermediate bracket and the upper-tier battery array.

Another example of any of the foregoing assemblies includes an enclosure, a cross-member, and at least one post mounted on the cross-member. The intermediate bracket is additionally directly secured to the at least one post.

In another example of any of the foregoing assemblies, the post is one of a plurality of posts that are mounted on the cross-member and that support the intermediate bracket.

Another example of any of the foregoing assemblies includes an enclosure tray of the enclosure. The enclosure tray has a floor. The enclosure tray further includes a forward wall, an aft wall, and opposing side walls extending horizontally from the forward wall to the aft wall. The cross-member extends along a cross-member axis between the opposing side walls of the enclosure tray.

Another example of any of the foregoing assemblies includes an enclosure lid secured to the enclosure tray to provide an enclosure having an interior.

Another example of any of the foregoing assemblies includes a first mechanical fastener that directly secures the intermediate bracket directly to the endplate and a second mechanical fastener that secures the intermediate bracket to the post.

Another example of any of the foregoing assemblies includes a mechanical fastener that directly secures the intermediate bracket to the endplate.

In another example of any of the foregoing assemblies, the lower-tier battery array and the intermediate bracket extend laterally outboard of the upper-tier battery array.

In another example of any of the foregoing assemblies, the lower-tier battery array is a first lower-tier battery array on a driver side. The assembly further includes a second lower-tier battery array on a passenger side. The intermediate bracket is secured directly to an endplate of the first lower-tier battery array and is secured directly to an endplate of the second lower-tier battery array.

In another example of any of the foregoing assemblies, the intermediate bracket is directly connected to the first and second lower-tier battery arrays exclusively through the endplates of the first and second lower-tier battery arrays.

In another example of any of the foregoing assemblies, the intermediate bracket supports more than one upper-tier battery array.

In another example of any of the foregoing assemblies, the intermediate bracket includes a cut-out that is vertically directly above a plurality of battery cells of the lower-tier battery array.

A multi-tier traction battery support method according to another exemplary aspect of the present disclosure includes supporting an intermediate bracket with an endplate of a lower-tier battery array and supporting an upper battery array with the intermediate bracket. The intermediate bracket is secured directly to the endplate Another example of the foregoing method includes supporting the intermediate bracket with a post secured to a cross-member within a traction battery.

Another example of any of the foregoing methods includes securing the intermediate bracket to the endplate using a first mechanical fastener and securing the intermediate bracket to the post using a second mechanical fastener.

Another example of any of the foregoing methods includes supporting the intermediate bracket with an endplate of a first lower-tier battery array and an endplate of a second lower-tier battery array.

In another example of any of the foregoing methods, the lower-tier battery array and the intermediate bracket extend laterally outboard of the upper-tier battery array.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A multi-tier traction battery of an electrified vehicle can include battery arrays on a lower-tier and battery arrays on one or more upper-tiers. Traction batteries with multiple tiers of battery arrays can have an increased vertical height and a higher center of gravity that traction batteries having only a single tier of battery arrays. The increased vertical height and higher center of gravity can, among other things, change how the multi-tier traction battery reacts to a load, such as an impact load.

This disclosure details assemblies and methods that are used to support the battery arrays of an upper-tier. The assemblies and method utilize an intermediate bracket that is directly secured to an endplate of a lower-tier battery array. The intermediate bracket can facilitate distributing and absorbing loads applied to the multi-tier traction battery.

Figure 1:
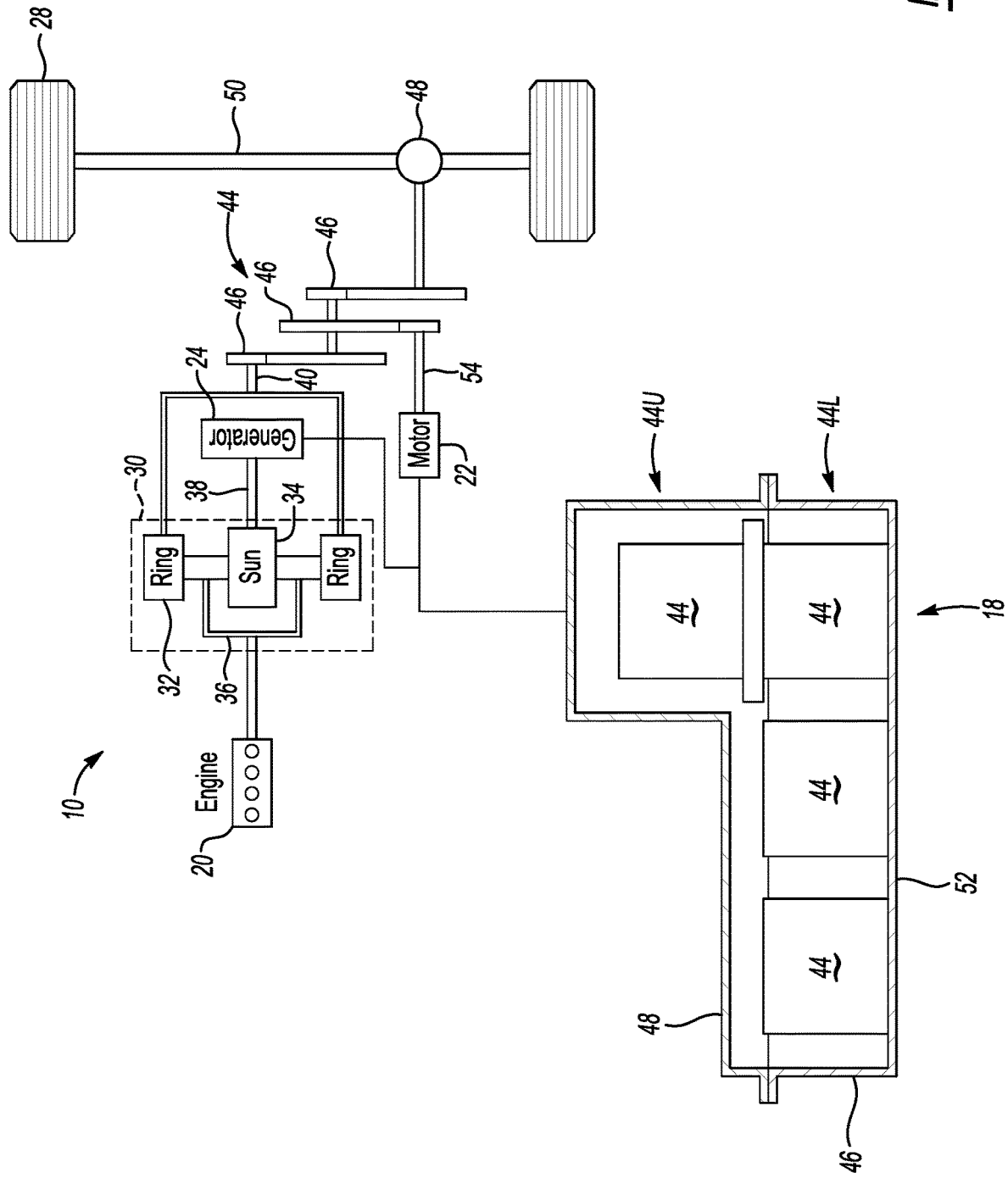
FIG. 1 schematically illustrates a powertrain of an electrified vehicle.
Figure 2:
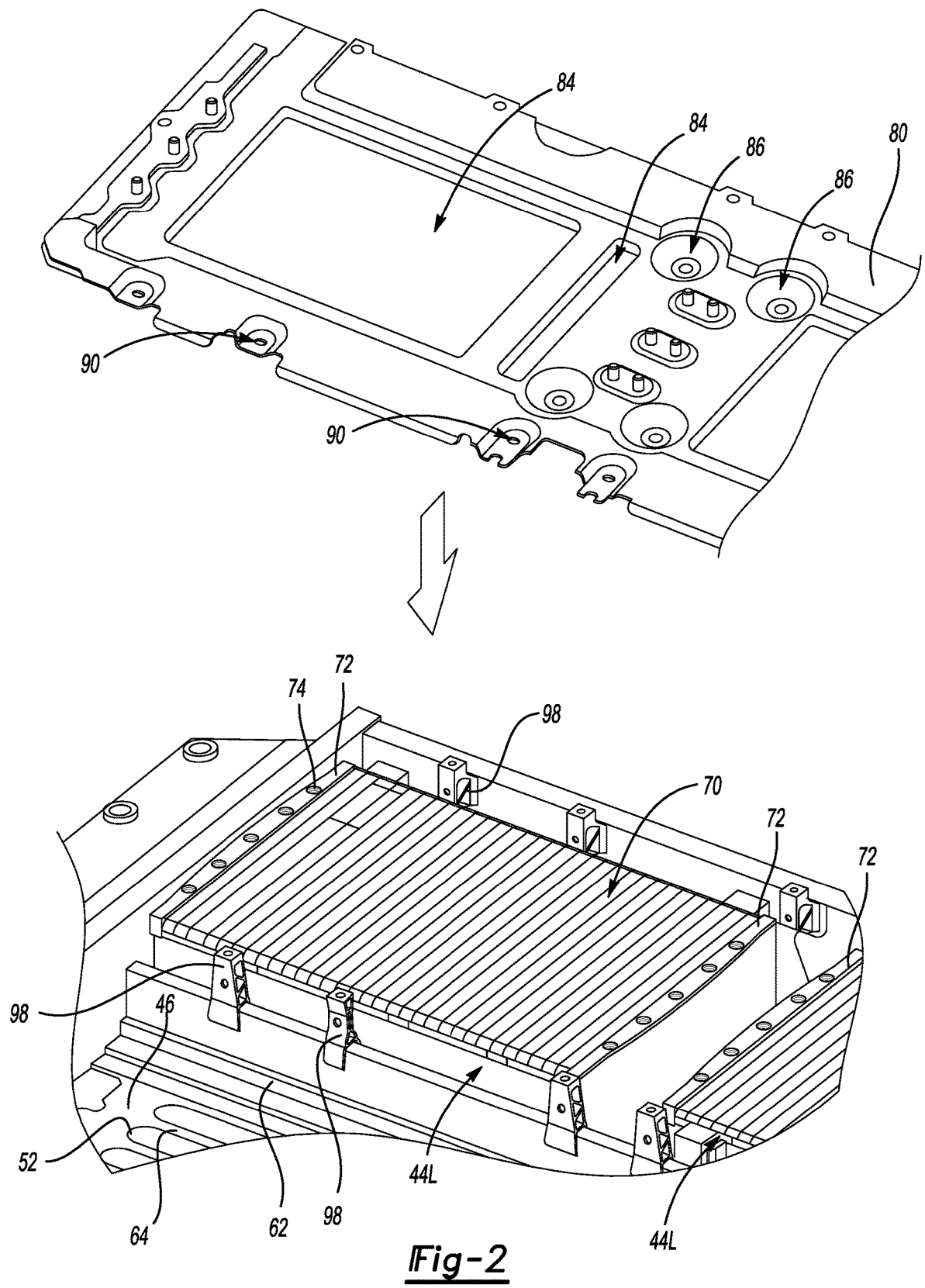
FIG. 2 illustrates an expanded view of selected portions of a multi-tier traction battery from the powertrain of FIG. 1.
Figure 3:
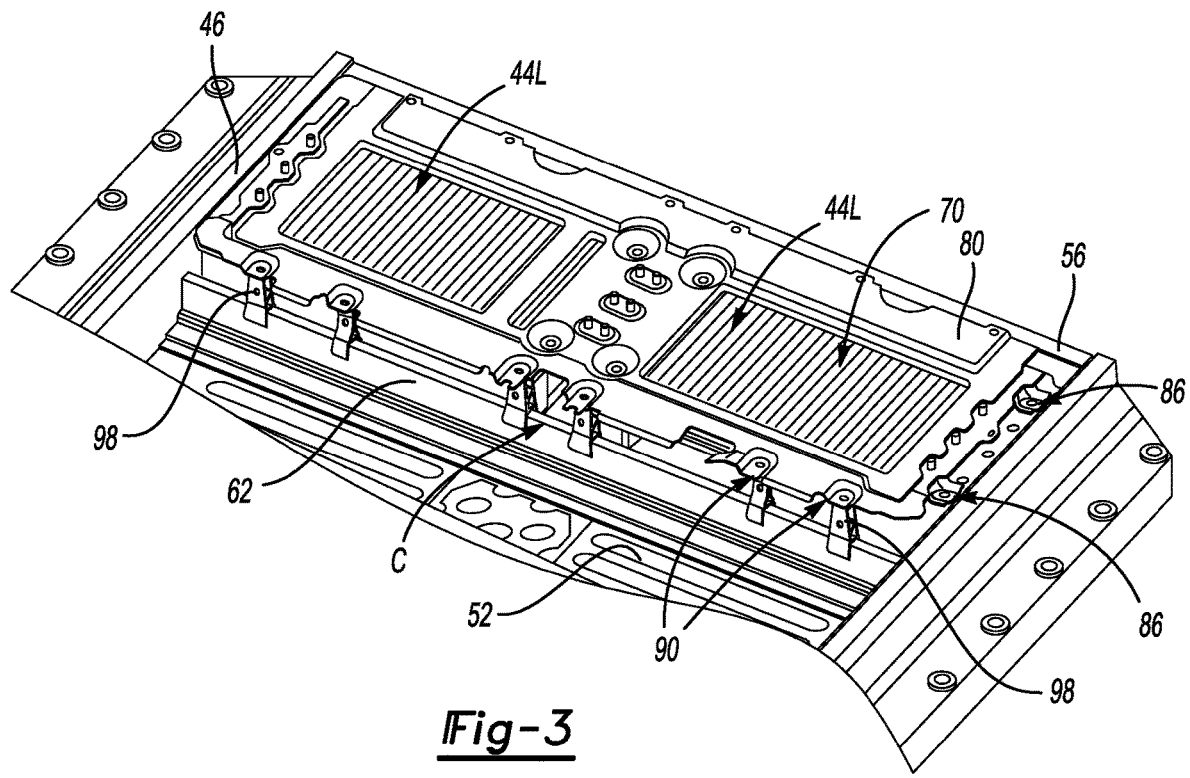
FIG. 3 illustrates an intermediate bracket of the traction battery secured directly to endplates of lower-tier battery arrays.

FIG. 1 schematically illustrates selected portions of a powertrain 10 of an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In an embodiment, the powertrain 10 is a powersplit powertrain system that employs a first drive system and a second drive system. The first drive system includes a combination of an engine 12 and a generator 14 (i.e., a first electric machine). The second drive system includes at least a motor 16 (i.e., a second electric machine), the generator 14, and at least one traction battery 18. In this example, the second drive system is considered an electric drive system of the powertrain 10. The first and second drive systems generate torque to drive one or more sets of vehicle drive wheels 20 of the electrified vehicle.

The engine 12, which is an internal combustion engine in this example, and the generator 14 may be connected through a power transfer unit 22. In one non-limiting embodiment, the power transfer unit 22 is a planetary gear set that includes a ring gear 24, a sun gear 26, and a carrier assembly 28. Of course, other types of power transfer units, including other gear sets and transmissions, may be used to connect the engine 12 to the generator 14.

The generator 14 can be driven by engine 12 through the power transfer unit 22 to convert kinetic energy to electrical energy. The generator 14 can alternatively function as a motor to convert electrical energy into kinetic energy, thereby outputting torque to a shaft 30 connected to the power transfer unit 22. Because the generator 14 is operatively connected to the engine 12, the speed of the engine 12 can be controlled by the generator 14.

The ring gear 24 of the power transfer unit 22 may be connected to a shaft 32, which is connected to vehicle drive wheels 20 through a second power transfer unit 34. The second power transfer unit 34 may include a gear set having a plurality of gears 36. Other power transfer units may also be suitable. The gears 36 transfer torque from the engine 12 to a differential 38 to ultimately provide traction to the vehicle drive wheels 20. The differential 38 may include a plurality of gears that enable the transfer of torque to the vehicle drive wheels 20. In this example, the second power transfer unit 34 is mechanically coupled to an axle 40 through the differential 38 to distribute torque to the vehicle drive wheels 20.

The motor 16 (i.e., the second electric machine) can also be employed to drive the vehicle drive wheels 20 by outputting torque to a shaft 42 that is also connected to the second power transfer unit 34. In one embodiment, the motor 16 and the generator 14 cooperate as part of a regenerative braking system in which both the motor 16 and the generator 14 can be employed as motors to output torque. For example, the motor 16 and the generator 14 can each output electrical power to the traction battery 18.

The traction battery 18 has the form of a high-voltage battery that is capable of outputting electrical power to operate the motor 16 and the generator 14. The traction battery 18 is a traction battery as it provides power to drive the vehicle drive wheels 20.

In the exemplary embodiment, the traction battery 18 is a battery pack that includes a plurality of battery arrays 44 or battery modules. Each of the battery arrays 44 includes a plurality of individual battery cells.

In the exemplary embodiment, the traction battery 18 includes a plurality of lower battery arrays 44L arranged on a lower-tier and a plurality of upper battery arrays 44U arranged on an upper-tier. The upper battery arrays 44U are vertically above the lower battery arrays 44L. Arranging battery arrays 44 in tiers can be necessary for packaging reasons and for other design reasons, such as increasing the energy density of the traction battery 18.

Vertical, for purposes of this disclosure, is with reference to ground and the normal orientation of an electrified vehicle having the powertrain 10 during operation.

With reference now to FIGS. 2-6 and continuing reference to FIG. 1, the traction battery 18 includes an enclosure 46 that houses the battery arrays 44 and other components of the traction battery 18. The enclosure 46 includes, among other things, an enclosure lid (FIG. 1) 48, an enclosure tray 52, a passenger side rail 54P, a driver side rail 54D, and an aft end rail 56. The enclosure lid 48 has been removed in FIGS. 2-4 to reveal the battery arrays 44U of the upper-tier and the battery arrays 44L of the lower-tier. In the assembled traction battery 18, the enclosure lid 48 can be secured to the enclosure tray 52 to enclose the battery arrays 44 within an interior of the enclosure 46.

In this example, the enclosure 46 includes a cross-member 62 within an interior of the enclosure 46. The cross-member 62 extends longitudinally in a cross-vehicle direction from the driver side rail 54D to the passenger side rail 54P. The cross-member 62 can help to reinforce the traction battery 18. The cross-member 62 adds support and helps to control the kinematics of the traction battery 18 when a load, such as an impact load, is applied to a vehicle having the traction battery 18.

The cross-member 62 is secured to a floor 64 of the enclosure tray 52. The cross-member 62 and the lower-tier battery arrays 44U are supported upon the floor 64 of the enclosure tray 52.

The battery arrays 44 each include a plurality of individual battery cells 70 disposed between endplates 72. The battery cells 70 can be compressed between the end plates 72. The battery arrays 44 are secured within the enclosure 46.

Figure 5:
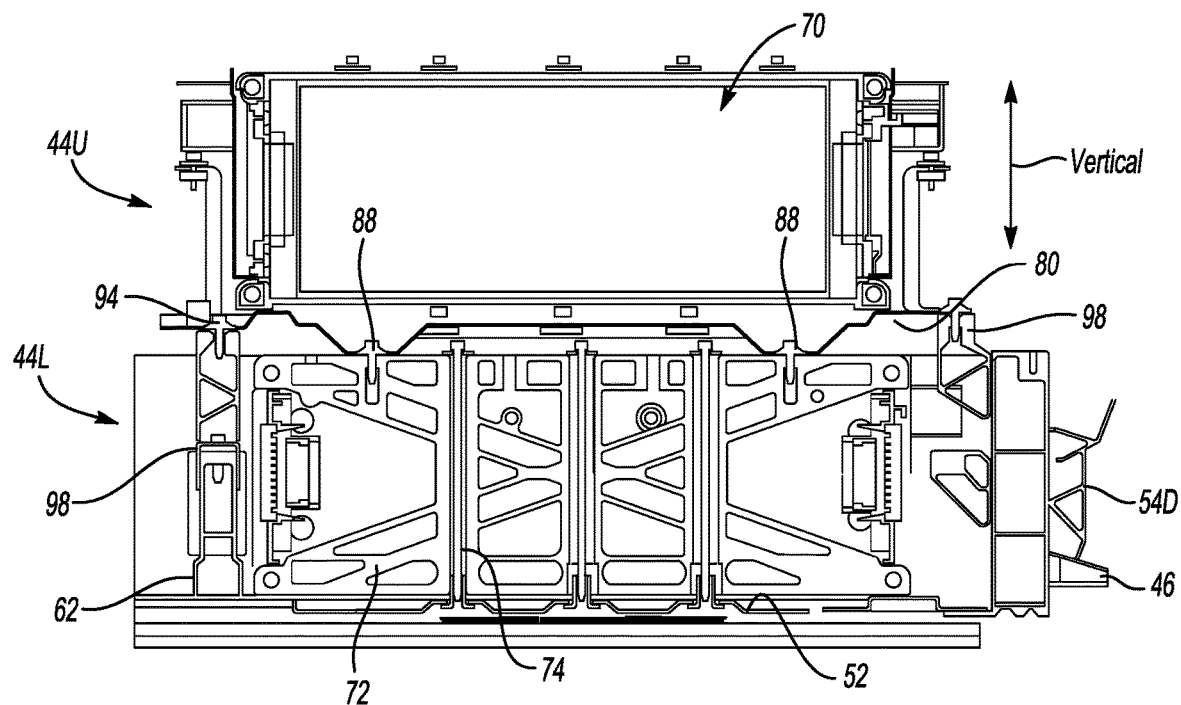
FIG. 5 illustrates part of a section taken at line 5-5 in FIG. 4.
Figure 6:
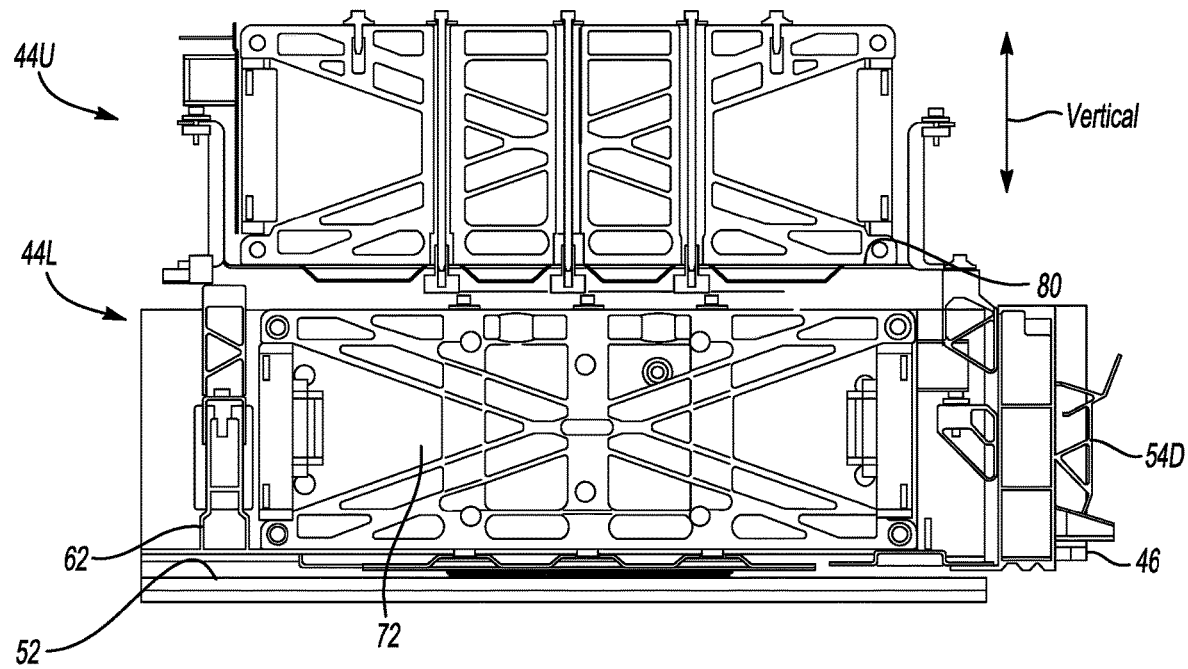
FIG. 6 illustrates part of a section view taken at line 6-6 in FIG. 4.

As shown in FIG. 5, for the lower-tier battery arrays 44L, mechanical fasteners 74 can extend through the endplates 72 to secure the lower-tier battery arrays 44L to the floor 64 of the enclosure tray 52.

In this example, the upper-tier battery arrays 44U are supported on an intermediate bracket 80, which is directly secured to the endplates 72 of the lower-tier battery arrays 44U. The intermediate bracket 80 can also be referred to as a platform, upper-tier tray, or mid-tray. The intermediate bracket 80 can be a metal or metal alloy structure. The intermediate bracket 80 can include cutouts 84 to reduce an overall weight of the intermediate bracket 80. At least one of the cutouts 84 is directly vertically above the battery cells 70 within the lower-tier battery array 44U.

The intermediate bracket 80 includes apertures 86 that receive mechanical fasteners 88 used to directly secure the intermediate bracket 80 to at least one endplate 72 of the lower-tier battery arrays 44U.

The intermediate bracket 80 additionally includes apertures 90 that receive mechanical fasteners 94 used to directly secure the intermediate bracket 80 to a respective post 98 that extends upwardly from the cross-member 62 or the aft end rail 56. The posts 98 and the endplates 72 support the intermediate bracket 80 in a vertically elevated position within the enclosure 46.

The posts 98 can be extruded or cast. The posts 98 can be a metal or metal alloy material. The posts 98 can be welded or mechanically fastened to the cross-member 62 or the aft end rail 56.

When the intermediate bracket 80 is supporting the upper-tier battery array 44U, the lower-tier battery array 44L is vertically beneath the intermediate bracket 80 and the upper-tier battery array 44U.

In this example, the lower-tier battery arrays 44L include two lower-tier battery arrays 44L vertically beneath the intermediate bracket 80. One of these lower-tier battery arrays 44L is on a driver side of the traction battery 18, and the other is on a passenger side of the traction battery 18. The lower-tier battery arrays 44L are spaced from each other in a cross-vehicle direction to provide a clearance area C (FIG. 3) between the two lower-tier battery arrays 44L. Wiring and other various components of the traction battery 18 can be disposed within the clearance area C.

The upper-tier battery arrays 44U, in this example, comprise two upper-tier battery arrays 44U. One of these upper-tier battery arrays 44U is on the driver side of the traction battery 18, and the other is on the passenger side of the traction battery 18. The upper-tier battery arrays 44U are closer together in a cross-car direction that the lower-tier battery arrays 44L. Thus, an area A between the two upper-tier battery arrays 44U is not as wide in a cross-car direction as the clearance area C between the two lower-tier battery arrays 44L.

Figure 4:
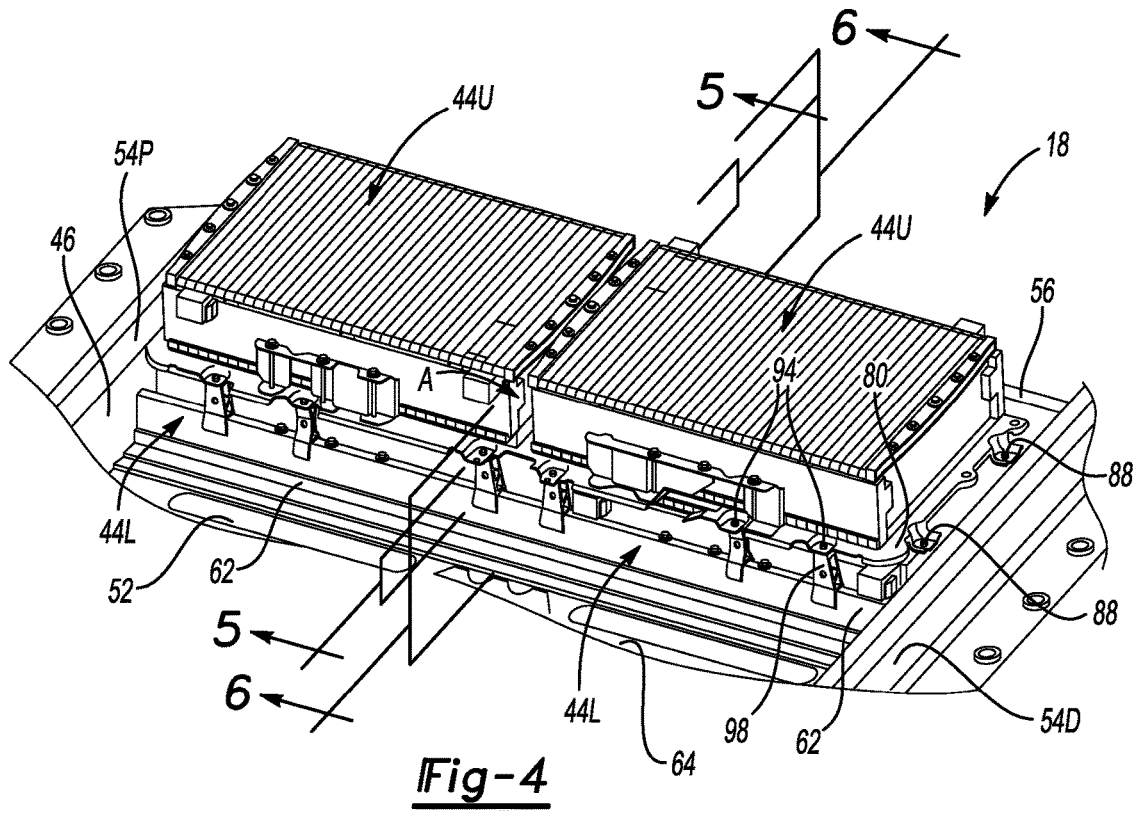
FIG. 4 illustrates upper-tier battery arrays supported on the intermediate bracket.

The dimensions of the individual battery arrays 44 within the traction battery 18 are substantially the same. Due to the clearance area C between the two lower-tier battery arrays 44L being greater than the clearance area A between the two upper-tier battery arrays 44U, the lower-tier battery arrays 44L and the intermediate bracket 80 extend laterally outboard of the upper-tier arrays 44U on both the passenger side and the driver side. That is, as shown in FIG. 4, the lower-tier battery arrays 44L and the intermediate bracket 80 extend outboard further than either of the upper-tier battery arrays 44U. This "stepped" configuration can provide clearance to facilitate fastening the intermediate bracket 80 to the endplate 72 of the lower-tier battery arrays 44L.

The intermediate bracket 80 supports a plurality of upper-tier battery arrays 44U. In this example, the intermediate bracket 80 supports two upper-tier battery arrays 44U. The intermediate bracket 80 extends as a single continuous structure over two separate and distinct lower-tier battery arrays 44L. Utilizing the same intermediate bracket 80 to span over two lower-tier battery arrays can, among other things, reduce overall build and part complexity.

An example supporting method for a multi-tier traction battery includes an intermediate bracket being directly secured to at least one endplate of a lower-tier battery array. The method further includes supporting at least one upper-tier battery array with the intermediate bracket that is directly secured to the at least one endplate of the lower-tier battery array.

Features of the disclosed examples can include an intermediate bracket secured directly to an endplate of a lower-tier array within a traction battery. The intermediate bracket can additionally be secured to posts extending from a cross-member of the traction battery. Securing the intermediate bracket to these different structures can, among other things, help to control the kinematics within the battery when load is applied to the battery.

During an impact event, the intermediate bracket can help to keep the upper-tier arrays retained. The securing of the intermediate bracket to the endplates of the lower-tier array can help to increase a natural frequency of the intermediate bracket and upper-tier arrays which can reduce a trampolining effect of the intermediate bracket. The attachment of the intermediate bracket to the lower-tier tray can also reduce a moment of the battery arrays when a load is applied to the battery pack. Some of the load is directed through the attachments to the lower-tier arrays. Attaching the intermediate bracket directly to the lower-tier battery arrays can reduce overall complexity by limiting the number of additional brackets and supports required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A multi-tier traction battery support assembly, comprising:
    a lower-tier battery array;
    an intermediate bracket directly secured to at least one endplate of the lower-tier battery array;
    an upper-tier battery array supported on the intermediate bracket;
    a cross-member adjacent a first side of the lower-tier battery array; and
    at least one post mounted on the cross-member, the intermediate bracket directly secured to the at least one post at an attachment location on the first side of the lower-tier battery array, the intermediate bracket extending from the attachment location on the first side of the lower-tier battery array to another attachment location on an opposite, second side of the lower-tier battery array such that the intermediate bracket spans the lower-tier battery array.

2. The multi-tier traction battery support assembly of claim 1, wherein the lower-tier battery array is vertically beneath the intermediate bracket and the upper-tier battery array.

3. The multi-tier traction battery support assembly of claim 1, wherein the at least one post is one of a plurality of posts that are mounted on the cross-member and that support the intermediate bracket.

4. The multi-tier traction battery support assembly of claim 1, further comprising an enclosure tray of the enclosure, the enclosure tray having a floor, the enclosure tray further including a forward wall, an aft wall, and opposing side walls extending horizontally from the forward wall to the aft wall, wherein the cross-member extends along a cross-member axis between the opposing side walls of the enclosure tray.

5. The multi-tier traction battery support assembly of claim 4, further comprising an enclosure lid secured to the enclosure tray to provide an enclosure having an interior.

6. The multi-tier traction battery support assembly of claim 1, further comprising at least one first mechanical fastener that directly secures the intermediate bracket to the at least one endplate and at least one second mechanical fastener that directly secures the intermediate bracket to the at least one post.

7. The multi-tier traction battery support assembly of claim 1, further comprising at least one mechanical fastener that directly secures the intermediate bracket to the at least one endplate.

8. The multi-tier traction battery support assembly of claim 1, wherein the lower-tier battery array and the intermediate bracket extend laterally outboard of the upper-tier battery array.

9. The multi-tier traction battery support assembly of claim 1, wherein the lower-tier battery array is a first lower-tier battery array on a driver side, and further comprising a second lower-tier battery array on a passenger side, the intermediate bracket secured directly to at least one endplate of the first lower-tier battery array and secured directly to at least one endplate of the second lower-tier battery array.

10. The multi-tier traction battery support assembly of claim 9, wherein the intermediate bracket is directly connected to the first and second lower-tier battery arrays exclusively through the endplates of the first and second lower-tier battery arrays.

11. The multi-tier traction battery support assembly of claim 9, wherein the intermediate bracket supports more than one upper-tier battery array.

12. The multi-tier traction battery support assembly of claim 1, wherein the intermediate bracket supports more than one upper-tier battery array.

13. The multi-tier traction battery support assembly of claim 1, wherein the intermediate bracket includes a cut-out that is vertically directly above a plurality of battery cells of the lower-tier battery array.

14. A multi-tier traction battery support method, comprising:
   supporting an intermediate bracket with at least one endplate of a lower-tier battery array, the intermediate bracket secured directly to the at least one endplate;
   supporting the intermediate bracket with at least one post that is secured to a cross-member at a position spaced from the lower-tier battery array, the intermediate bracket directly secured to the at least one post at an attachment location on a first side of the lower-tier battery array, the intermediate bracket extending from the attachment location on the first side to another attachment location on an opposite, second side of the lower-tier battery array such that the intermediate bracket spans the lower-tier battery array; and
   supporting an upper battery array with the intermediate bracket.

15. The multi-tier traction battery support method of claim 14, further comprising securing the intermediate bracket to the at least one endplate using at least one first mechanical fastener and securing the intermediate bracket to the at least one post using at least one second mechanical fastener.

16. The multi-tier traction battery support method of claim 14, further comprising supporting the intermediate bracket with at least one endplate of a first lower-tier battery array and at least one endplate of a second lower-tier battery array.

17. The multi-tier traction battery support method of claim 14, wherein the lower-tier battery array and the intermediate bracket extend laterally outboard of the upper-tier battery array.

18. A multi-tier traction battery support assembly, comprising:
   a lower-tier battery array, the lower-tier battery array including a plurality of battery cells disposed between endplates of the lower-tier battery array;
   at least one first post spaced from a first side of the lower-tier battery array;
   a cross-member secured to a floor of an enclosure tray, the at least one first post mounted on the cross-member;
   at least one second post spaced from an opposite, second side of the lower-tier battery array;
   an intermediate bracket attached directly to the endplates, the at least one first post, and the at least one second post such that the intermediate bracket spans the lower-tier battery array; and
   an upper-tier battery array supported on the intermediate bracket.

19. The multi-tier traction battery support assembly of claim 18, wherein the lower-tier battery array is a first lower-tier battery array and further comprising a second lower-tier battery array, the intermediate bracket directly connected to both the first and second lower-tier battery arrays.

\* \* \* \* \*